United States Patent [19]

Denny et al.

[11] Patent Number: 4,997,054
[45] Date of Patent: Mar. 5, 1991

[54] ADJUSTABLE WRIST REST

[75] Inventors: Thomas M. Denny, Kenosha, Wis.; Robert D. Doescher, Woodridge, Ill.

[73] Assignee: J. I. Case Company, Racine, Wis.

[21] Appl. No.: 338,270

[22] Filed: Apr. 14, 1989

[51] Int. Cl.$^5$ .............................................. B60N 2/46
[52] U.S. Cl. ................................... 180/331; 248/118; 297/412; 297/417
[58] Field of Search ....................... 280/336, 326, 332; 248/118; 297/411, 412, 417; 74/523

[56] References Cited

U.S. PATENT DOCUMENTS

| | | | |
|---|---|---|---|
| 326,185 | 9/1885 | White | 248/118 |
| 535,168 | 3/1895 | Krehbiel | 297/417 |
| 1,706,634 | 3/1929 | Seils | 248/118 |
| 3,893,728 | 7/1975 | Holopainen | 180/331 |
| 4,140,200 | 2/1979 | Tucek | 180/332 |
| 4,200,166 | 4/1980 | Hansen | 180/315 |
| 4,491,325 | 1/1985 | Bersheim | 74/523 |
| 4,674,798 | 6/1987 | Beth et al. | 297/411 |
| 4,702,520 | 10/1987 | Whisler | 297/417 |

Primary Examiner—Charles A. Marmor
Assistant Examiner—Karin Tyson
Attorney, Agent, or Firm—Dykema Gossett

[57] ABSTRACT

A wrist rest is disclosed for use with a large construction or farm vehicle having a rotatable operator's seat. The rest is associated with joystick-like control mechanisms and assures that the operator's arm remains positioned stationary relative to the joystick control mechanism. That is, even if the operator were to rotate about the cab in his seat the rest will ensure that the operator's arm remains operably positioned stationary with respect to the joystick control mechanisms. The rest is releasably fixed to a control console and may be released and rotated or moved vertically to any desired position. In addition, the rest is configured to have a slanting portion that will overlie a corresponding slanting portion on the control console and allow the arm rest to be placed in a stowed position where it directly overlies the control console and is out of the operator's way.

5 Claims, 2 Drawing Sheets

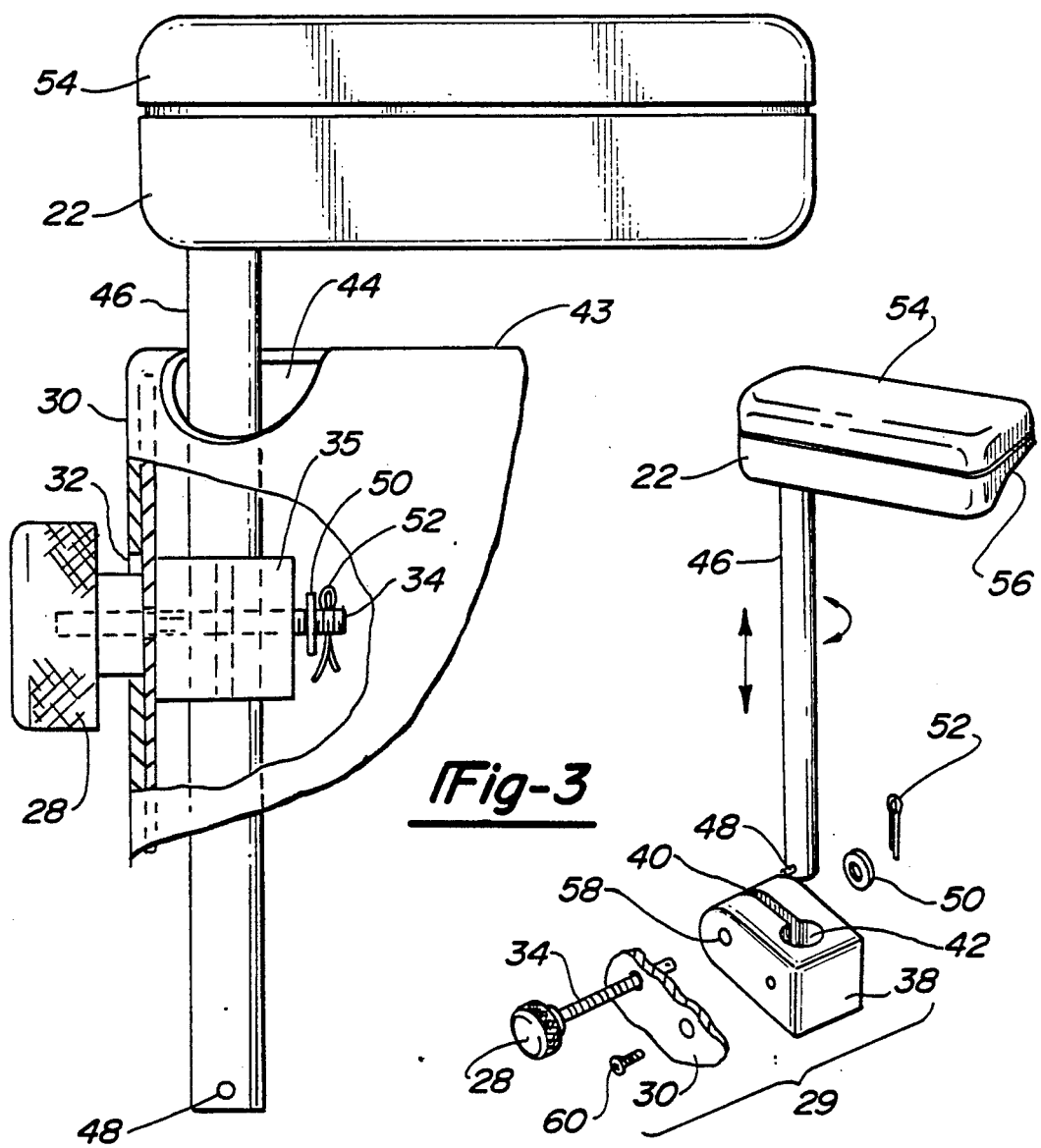
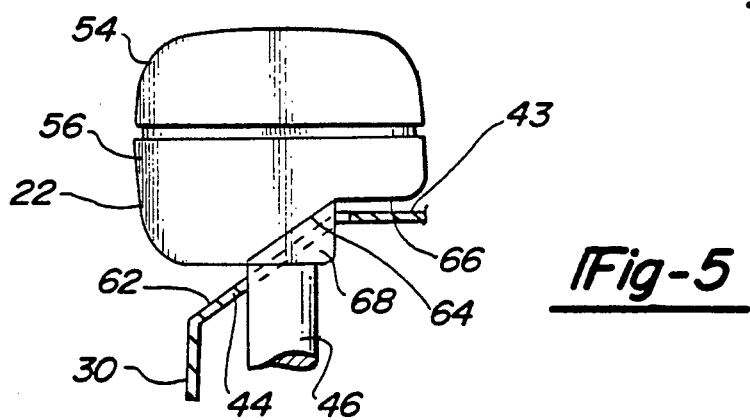

ADJUSTABLE WRIST REST

BACKGROUND OF THE INVENTION

The present invention relates to a wrist rest for use in conjunction with a joystick type control on a large construction or farm vehicle. With such controls, it is important that an operator's arm remain relatively stationary with respect to the joystick control even if the operator rotates about in the seat of the vehicle.

Large construction vehicles may be equipped with a rotating seat and several joystick like controls for operating various implements associated with the vehicle. Modern construction vehicles may also be equipped with arm rests that are attached to the seat and which support the operator's arm as he operates the joystick controls. In addition, vehicles are known that have non-rotating seats and a stationary arm rest associated with a control panel.

Problems arise with these arrangements since the arm rests are normally attached to the seat and thus rotate when the seat is rotated. Since the operator's arm is associated with the arm rest, this will change the orientation of the operator's arm with respect to the joystick control. Modern joystick controls are extremely sensitive and any shifting of the relative position of the operator's arm and the joystick control could be interpreted as feedback which is undesirable. Further, the prior art arm rests do not allow easy adjustment of the arm rest for operation of more than one joystick. Modern construction vehicles may have more than one joystick and it would be desirable if the rest could be easily adjusted so as to support the operator's arm during manipulation of anyone of several joysticks. Additionally, several operator's may use the vehicle and it is important that the rest be adjustable to accommodate any of the operator's who may use the vehicle. Thus, there has been a need for an arm rest assembly that solves these problems and disadvantages.

It is therefore an object of the present invention provide an assembly that supports an operator's wrist and that remains fixed with respect to a joystick control as the operator's seat is rotated about the vehicle cab.

It is further an object of the present invention to provide a wrist rest assembly that may be adjusted into operative position with any one of several joystick controllers.

It is yet another object of the present invention to provide a wrist rest assembly that can be adjusted to any one of several vertical heights to accommodate various operators and that may be stowed in an out-of-the-way position if the operator deems it unnecessary to use the wrist rest. Moreover, it is an object of this invention to achieve these characteristics with a wrist rest assembly that is sturdy and requires relatively few moving parts.

These and other objects are addressed by the present invention.

SUMMARY OF THE INVENTION

In accordance with the present invention, a wrist rest assembly for use with a large construction or farm vehicle is disclosed which remains at rest in a fixed position as the operator's seat is rotated about the cab. This results in the operator's arm being maintained at a fixed position relative to a joystick control thereby minimizing the possibility of any unintentional feedback to a joystick controller. In the disclosed embodiment, a control console is disposed in the vehicle cab to the right of the operator's seat which console contains several joystick controllers. The rest assembly of the present invention is attached to the control console and can be rotated to any one of several positions so as to properly position an operator's arm with respect to a particular joystick. In addition, the rest can be adjusted vertically to accommodate various operator's arms or to position the rest in a stow or out-of-the-way position if the operator does not deem the rest necessary.

The wrist rest assembly of the present invention includes a lock knob that is associated with a fastener assembly. A bolt portion of the lock knob is received within an opening in a C-clamp The C-clamp has a guide aperture near the base of its C-like shape and the rest has a shaft mounted to it that extends through the guide aperture. The lockknob serves to secure the shaft at any desired rotational and vertical position within the C-clamp. An alignment pin formed on the shaft allows it to be removed from the C-clamp for disassembly of the control console or replacement.

The wrist rest is formed with a slanting portion, corresponding to a slanting portion on the control console, so that it can be stowed in an out-of-the-way position where it will not interfere with the operator's manipulation of the joystick controls. When an operator is using the rest he positions his arm on it and manipulates the joystick controllers. If the operator must rotate in his seat to a new position, the surface of the rest will tend to restrain his arm in the position it is in with respect to the joystick controller. Thus, even though the operator is rotating about the cab his arm remains fixed with respect to the joystick controller and no undesired feedback will be transmitted to the joystick controller.

BRIEF DESCRIPTION OF THE DRAWINGS

FIG. 3 is a partially cut-away view along line 3—3 of FIG. 2 showing the mounting of the wrist rest of the present invention.

FIG. 4 is an exploded view showing the wrist rest mounting assembly of the present invention.

FIG. 5 is a cross-section showing the configuration of the wrist rest that allows it to be stowed in an out-of-the-way position.

DETAILED DESCRIPTION OF THE INVENTION

Figure 1:
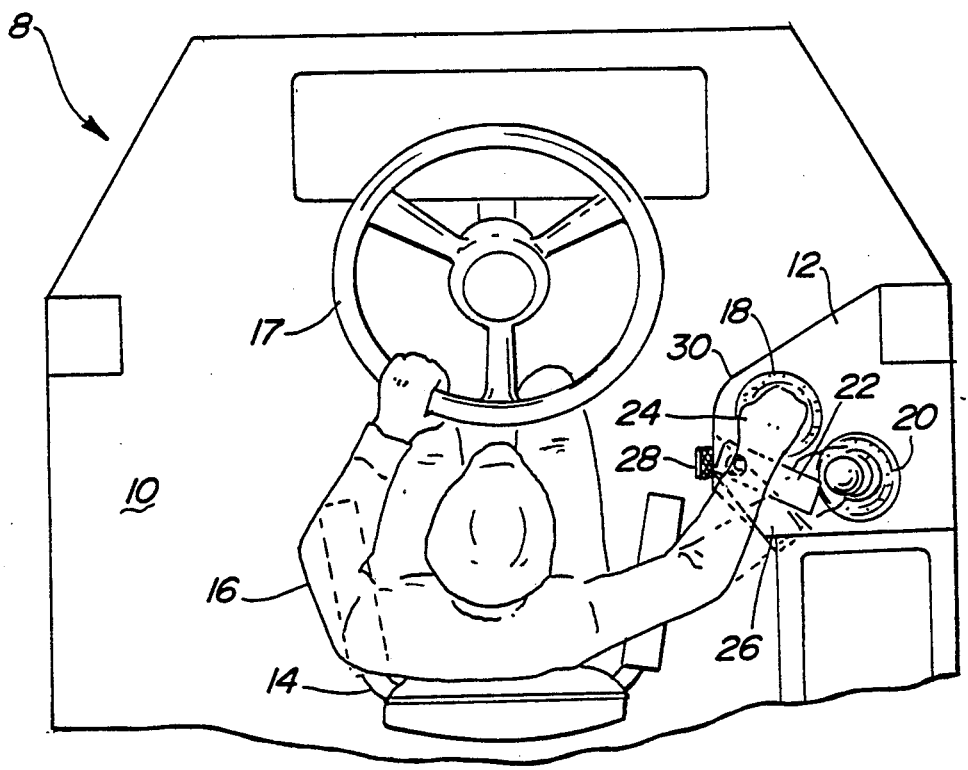
FIG. 1 is a plan view of the top of a vehicle cab showing the wrist rest of the present invention.

As shown in FIG. 1, a large construction or farm vehicle 8 has a vehicle cab 10 with a control console 12 fixed to the floor thereof. A seat 14 receives an operator 16 and seat 14 is rotatably attached to the vehicle cab floor. The control console 12 has first joystick controller 18, second joystick controller 20, and wrist rest 22 which allows the operator's arm 24 to be operably positioned near the controllers 18, 20. As shown in phantom at 26 the wrist rest 22 may be rotated to other positions to support the operator's arm 24 near the second joystick controller 20. At either the position shown at 22 or position 26 the wrist rest will remain fixed while it is being used. A knob 28 forms part of a wrist rest lock assembly 29 and allows rest 22 to be rotated to the position shown at 26, or any other desired position. Control console 12 has a side wall 30 with an aperture 32 formed therethrough. Lock knob 28 is formed with a bolt member 34 that extends through aperture 32 and into a C-clamp 35 which has opposed sides 36 and 37 and base portion 38. A gap 40 is formed between the opposed sides 36 and 37 and a shaft guide 42 is formed near the base of the C-clamp 35.

Figure 2:
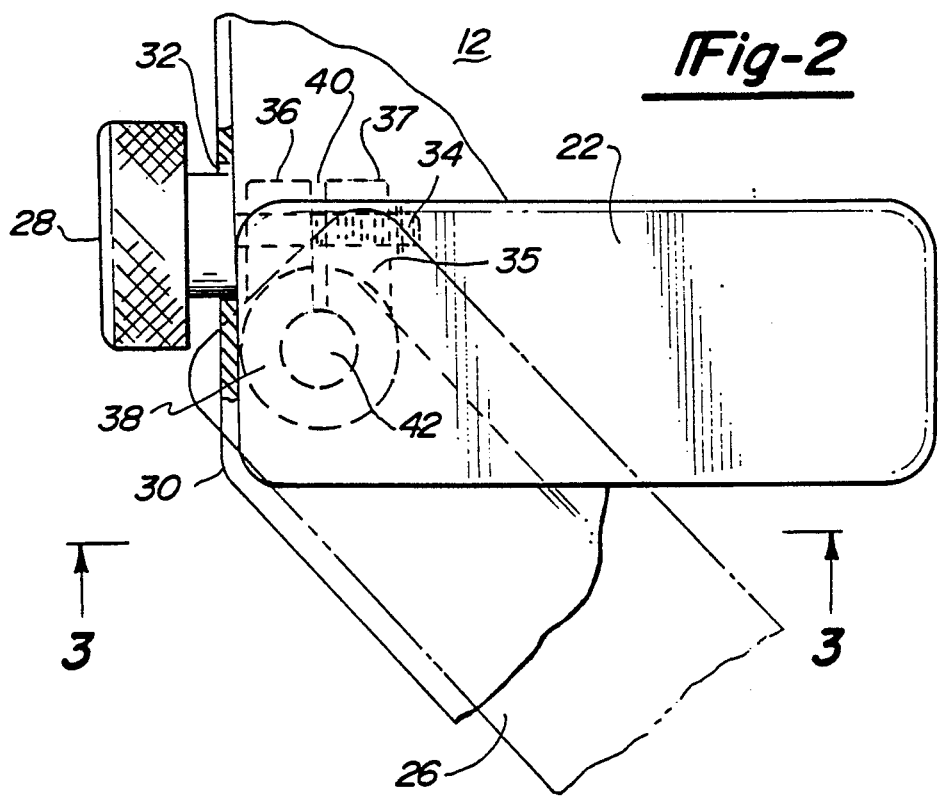
FIG. 2 is a partially cut-away plan view showing the wrist rest of the present invention in an operative and a stowed position.

As shown in FIG. 3, control console 12 has a upper wall 43 formed with an opening 44 for receiving a shaft 46 of the rest 22. It is to be understood that the shaft 46 is received within guide 42 and that the tightening of lock knob 28 causes sides 36 and 37 of the C-clamp 35 to come close together thus reducing the gap 40 and securing shaft 46 within guide 42. Near the bottom of shaft 46 an alignment pin 48 is formed that will normally block removal of rest 22 from clamp 35. When it is desired to completely remove rest 22 from clamp 35, lock knob 28 is loosened and alignment pin 48 is aligned with gap 40; the entire rest can then be removed. As can be understood from FIGS. 1, 2 and 3 rest 22 can be rotated to any one of several positions and moved vertically to any desired position. This allows the fixed rest 22 to be used in conjunction with anyone of several joystick controllers or used by a wide variety of operators. As is also shown in FIG. 3, a washer 50 and cotter pin 52 secure the bolt to the C-clamp 35.

As is shown in FIG. 4, the rest 22 is formed of an upper section 54 and a lower section 56. Upper section 54 is formed of a foam-like material that will create friction tending to keep an operator's arm stationary when it is positioned thereon.

Rest lock assembly 29 can be best appreciated from the exploded view shown in FIG. 4. As shown in FIG. 4, lock knob 28 is associated with bolt member 34 that extends into a bolt hole 58 formed in C-clamp 35. Washer 50 and cotter pin 52 are received by bolt 34 on the opposite side of C-clamp 35. In addition, set screw 60 extends through the side wall 30 to secure C-clamp 35 to side wall 30.

FIG. 5 shows the cross-sectional shape of the lower portion 56 of rest 22 and how it is stowed in an out-of-the-way position on the control console 10. As can be seen in FIG. 5, the side wall 30 and top wall 43 of control console 10 are connected by a slanting portion 62. This portion is preferably slanted at an angle of 38 degrees. Lower portion 56 has a corresponding slant portion 64, also preferably formed at 38 degrees, that will overlie the console slant portion 62 when rest 22 has been dropped to a vertically lowered position. In addition, lower portion 56 of rest 22 has a straight portion 66 that will overlie the top 43 of the control console 10. At the shaft end of the lower portion 66 there is an unslanted portion 68. Unslanted portion 68 will fit into opening 44 within the console 10 when rest 22 is in its stowed position. It is important that portion 68 be unslanted since this will provide better mounting and greater support for shaft 46 within rest 22. As can be appreciated from FIG. 5, when rest 22 is placed in its stowed position, lower portion 56 will be closely received upon control console 10. Slanted portion 64 will align with slanted portion 62 of control console 10, straight portion 66 will align with the flat top 43 of the control console and unslanted portion 68 will extend into opening 44 formed within control console 10.

A working embodiment of the present invention has been disclosed, however, further modifications of the invention may be made without departing from the scope and content of the invention, which can be better understood when considered in light of the appended claims.

We claim:
1. A wrist rest assembly for use with a vehicle comprising:
   a vehicle cab;
   a control console mounted to said vehicle cab and having at least one implement control mechanism;
   a rest member fixed to said vehicle cab near the location of said implement control mechanism so as to support an operator's arm for manipulation of the implement control mechanism;
   a seat mounted so as to be capable of being rotated about the vehicle cab, said rest siding the operator in maintaining his arm stationary with respect to the implement control mechanism as he rotates about the cab in the vehicle seat;
   said control console is formed with a side wall and a top wall:
   an opening being formed in said side wall of said control console and a C-clamp being fixed to said side wall of said control console in the vicinity of said opening;
   a lock knob extending through said opening in said side wall of said control console and having a bolt member attached to one end thereof;
   said C-clamp being formed with bolt holes aligned with said opening in said control console and receiving said bolt portion of said lock knob, said C-clamp further being formed with a guide portion; and
   said rest being formed with an upper portion and a generally downwardly extending shaft portion, said shaft portion being received within said guide portion of said C-clamp and said lock knob being operable to lock said C-clamp about said shaft to secure said arm rest at a selected rotational and vertical position, said lock knob being capable of being loosened to allow said arm rest to be rotated or moved vertically into a new selected position.

2. A wrist rest assembly as recited in claim 1 and further wherein said C-clamp is formed of two arm portions and an intermediate base portion, a gap being defined as the area between said two arm portions and said shaft portion of said arm rest being formed with an alignment pin, alignment of said pin with said gap allowing said rest to be removed from said C-clamp.

3. A wrist rest assembly for use with a vehicle comprising:
   a vehicle cab;
   a control console mounted to said vehicle cab and having at least one implement control mechanism;
   a rest member fixed to said vehicle cab near the location of said implement control mechanism so as to support an operator's arm for manipulation of the implement control mechanism;
   a seat mounted so as to be capable of being rotated about the vehicle cab, said rest aiding the operator in maintaining his arm stationary with respect to the implement control mechanism as he rotates about the cab in the vehicle seat;
   said rest is fixed to said control console and extends through an opening in a top portion of said control console;
   said control console being formed with a vertically straight portion and a downwardly slanting portion extending from said straight portion in the vicinity of said opening; and said rest being formed with a first straight portion corresponding to said straight portion of said control console and a second slanted portion corresponding to said slanted portion of said control console such that said rest can be moved vertically downwardly into abutting contact with said control console to place said rest in a stowed position.

4. A wrist rest assembly as recited in claim 3 and further wherein:
    said rest further has an unslanted portion at one axial end thereof and a shaft portion extending through said opening in said control console;
    said shaft portion being fixed within said rest at the axial end of said rest formed by said unslanted portion; and
    wherein said unslanted portion is received within the opening in said control console when said rest is placed in its stowed position.

5. A wrist rest to be used in conjunction with a joystick controller or the like comprising:
    a control console having at least one control mechanism, said control console being formed with a side wall extending therearound and a top wall portion, said control console having a slanted portion interconnecting said side wall and top portions at at least a part of the periphery of said control console;
    a first opening extending through said control console;
    a rest having an upper portion and a downwardly extending shaft portion, said shaft portion being received within said first opening in said control console;
    a second opening extending through said side wall; a rest lock assembly comprising a lock knob with an associated bolt member attached at one axial end thereof, said bolt member extending through said second opening in said side wall of said control console;
    a C-clamp fixed to said side wall of said control console and having a guide portion receiving said shaft portion of said rest, said C-clamp further receiving said bolt portion of said lock knob, said lock knob turning said bolt within said C-clamp to tighten said C-clamp thus securing said shaft portion at a desired position or loosening said C-clamp to allow said shaft portion to be rotated and moved vertically within said guide portion of said C-clamp; and
    said upper portion of said rest being formed with a first straight portion extending longitudinally along one lateral side thereof and extending laterally inwardly into the rest, a second slanting portion formed over the majority of the longitudinal length of said rest at a laterally central extent thereof and corresponding to the slanted portion of said control console, an unslanted portion at one longitudinal extent of said rest at a laterally central extent corresponding to the extent of said slanted portion of said rest exists, said arm being capable of being placed in a stow position where said straight portion overlies said top wall of said control console, said slanted portion overlies said slanted portion of said control console and said unslanted is received within the opening in said control console.

* * * * *

UNITED STATES PATENT AND TRADEMARK OFFICE
CERTIFICATE OF CORRECTION

PATENT NO.  : 4,997,054

DATED       : March 5, 1991

INVENTOR(S) : Thomas M. Denny and Robert D. Doescher

It is certified that error appears in the above-identified patent and that said Letters Patent is hereby corrected as shown below:

In column 4, line 14, "siding" should be --aiding--.

Signed and Sealed this

Eleventh Day of August, 1992

Attest:

DOUGLAS B. COMER

*Attesting Officer*  *Acting Commissioner of Patents and Trademarks*